United States Patent [19]

Kobayashi et al.

[11] Patent Number: 4,664,431
[45] Date of Patent: May 12, 1987

[54] APPARATUS FOR CLOSING AND REOPENING THE COVER FOR A CONTAINER

[75] Inventors: Hisamine Kobayashi; Katsuhiro Izuhara, both of Nagoya, Japan

[73] Assignee: Tipton Manufacturing Corporation, Nagoya, Japan

[21] Appl. No.: 726,831

[22] Filed: Apr. 24, 1985

[30] Foreign Application Priority Data

May 1, 1984 [JP] Japan .............................. 59-64653[U]
May 1, 1984 [JP] Japan .............................. 59-64654[U]

[51] Int. Cl.⁴ .............................................. E05C 9/10
[52] U.S. Cl. ...................................... 292/260; 292/25
[58] Field of Search .................. 292/304, 68, 260, 25, 292/157, 259, 36

[56] References Cited

U.S. PATENT DOCUMENTS

| | | | |
|---|---|---|---|
| 707,011 | 8/1902 | Reynolds | 292/260 X |
| 1,369,969 | 3/1921 | Fairbanks et al. | 292/260 X |
| 2,707,575 | 5/1955 | Wheatley | 292/260 X |
| 3,823,512 | 7/1974 | Kobayashi | 51/164 |

FOREIGN PATENT DOCUMENTS 1242204 8/1960 France ................................. 292/260
50-36269 10/1975 Japan .

Primary Examiner—Richard E. Moore

Attorney, Agent, or Firm—Wenderoth, Lind & Ponack

[57] ABSTRACT

For use with a container with a removable cover at the top opening, at least one pair of cover tightening members are pivotally linked with each other and are mounted to the cover so that they can be operated to tighten the cover to the container or release it from the container. Specifically, each of the tightening members has an internally threaded central bore through it for accommodating its operating member which is also threaded to engage the central bore. The tightening member further includes stationary or fixed pawls at both ends thereof that engage or disengage with the flanged lateral sides of the container. Thus, when the operating member advances through the central bore, the pawls are disengaged from the flanges to allow the cover to be removed from the container, and when operating members are retracted, the pawls are made to engage the flanges to tighten the cover to the container. In either case, one tightening member is operatively associated with the other by means of the pivotted links. The operating member is operated automatically by a manipulating device which includes a pair of socket guns for rotating the operating members and a pair of pivotal latches for engaging and disengaging the cover. The manipulating device is movably mounted above the cover for selectively removing or attaching the cover to the container.

6 Claims, 6 Drawing Figures

APPARATUS FOR CLOSING AND REOPENING THE COVER FOR A CONTAINER

BACKGROUND OF THE INVENTION

1. Field of the Invention

The present invention relates to a cover closing and reopening apparatus, and more particularly to the apparatus of the kind that finds its application or use in any surface finishing machine having a removable cover-equipped container as one of its essential elements, and includes means whereby the cover can be tightened to or released from the container for its closing or reopening operations.

2. Description of the Prior Art

The conventional apparatus that provides the automatic closing and reopening operations for a cover which is removably mounted to the container used in a surface finishing machine includes a tightening member that releasably fastens the cover to the container. The tightening member has a pivotable or rotatable pawl at one end and a stationary or fixed pawl at the other end. The tightening member is operated by means of its operating member, which engages the central bore provided in the tightening member. Rotating the operating member tightens the cover to or releases it from the container through the rotating and stationary pawls which engage or disengage the flanged edges of the container. The construction of this apparatus and its operation are described in the Japanese Utility Model Official Publication No. 50 (1975)-36269, which is opened for public examination.

The apparatus that is constructed as mentioned above provides safety in operation and is effective in fastening the cover to the container tightly. It is also noted, however, that the operation that takes place for the cover mounting or demounting involves several steps. For the mounting operation, for example, the stationary or fixed pawl at one end of the tightening member is first made to engage the corresponding lateral flanged side of the top opening of the cover by moving the tightening member to place its one end in that position, and then the rotatable pawl at the other end is rotated so that it can be made to engage the corresponding flanged side. The demounting is done by reversing the above operation. This multiple-step operation makes the automatic operation difficult, lowering the total efficiency.

SUMMARY OF THE INVENTION

The apparatus of the present invention is simple in mechanical construction thus, reducing the number of steps required for automated cover mounting or demounting operation. For this purpose, a hook-shaped fixed pawl is provided at both ends of the tightening member, which is pivotally mounted to a cover for the container. For mounting of the cover, the tightening member is operated so that the fixed pawls at both ends thereof can be made to engage the respective lateral flanged edges of the top opening of the cover. This is done at the same time simply by turning one tightening member which is connected to the other tightening member by pivotted linek. For demounting of the cover, the above operation is reversed. Despite its simplified construction, the apparatus ensures that the cover is tightly fastened to the container when it is to be mounted.

The container for use with the apparatus according to the present invention has an equilateral polygonal- or cylindrical-form body having a rectangular opening at the top, the lateral sides of which are flanged. A removable cover or lid for the container is configured to present a rectangular shape to fit the top opening of the container. The cover includes at least one pair of tightening members, which are mounted to the top of the cover and pivotally supported so that they can be turned in a plane which is parallel to the top surface of the cover. Each of the tightening members has a hook-shaped stationary or fixed pawl at both ends thereof, and the pawls are provided to engage or disengage the flanged sides of the container. For mounting of the cover, the tightening members are operated so that they are turned through an angle from a position perpendicular to the lateral sides of the cover to a position that is displaced away from that original position. Thus, the pawls are automatically made to engage the corresponding lateral flanged sides of the container. For demounting of the cover, the above operation is reversed, returning the tightening members to their original position. Thus, this allows the cover to be removed from the container.

BRIEF DESCRIPTION OF THE DRAWINGS

The above and other objects and features of the present invention will become apparent from the detailed description of several preferred embodiments that follows by referring to the accompanying drawings, in which.

DETAILS OF THE PREFERRED EMBODIMENTS

Figure 1:
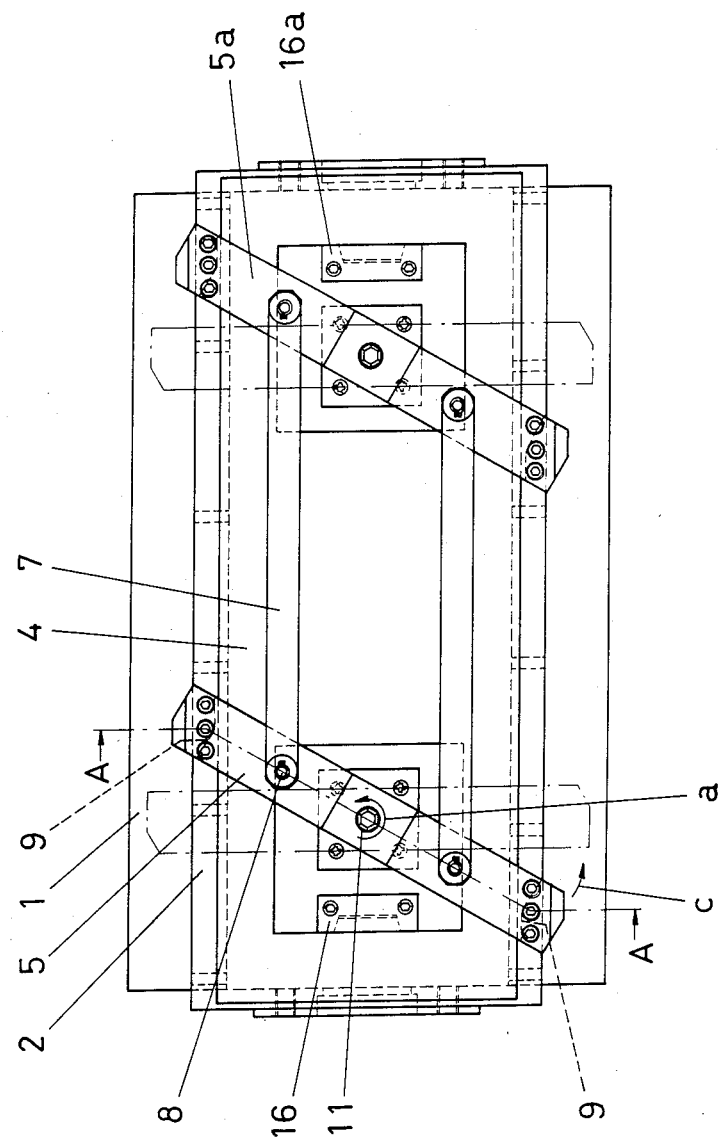
FIG. 1 is a plan view of an example of the configuration of a container, to which the cover constructed according to the present invention is removably mounted.
Figure 2:
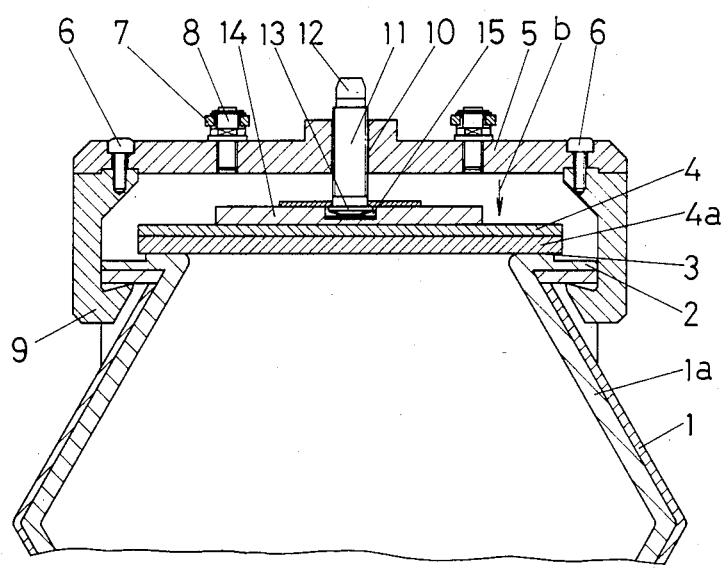
FIG. 2 is a partly sectional view of the container of FIG. 1, showing details associated with the cover mounting or removing operation.

A container 1 to be used in conjunction with the present invention is shown in FIGS. 1 and 2, and is usually used for the surface finishing process. Generally, the container 1 has an equilateral polygonal- or cylindrical-form body having an opening 3 at the top, and is lined with a rubber or synthetic resin lining 1a inside. The opening 3 has a peripheral flanged edge 2. A cover 4, which is removably mounted over the container 1, is furnished with a rubber or synthetic resin lining 4a that allows the cover 4 to be in intimate contact with the peripheral edge of the opening 3, thus keeping the interior of the container 1 hermetically sealed.

Now, the arrangement that allows the cover 4 to be tightened to or untightened from the container 1 is described by referring particularly to FIGS. 1 and 2. It includes at least one pair of tightening members 5, 5a that are arranged in parallel with each other above the cover 4 and are coupled with each other by means of two parallel pivotted links 7. Each of the links 7 has the opposite ends thereof pivotally connected to the corresponding tightening members 5, 5a by means of pins 8. Thus, the tightening members are operatively associated with each other by means of those links 7, and operating either of them causes the other to operate in the same manner. Each of the tightening members 5, 5a has a hook-shaped fixed or stationary pawl 9 at both ends thereof, which is fixed to the member by means of a bolt 6. The tightening member 5, 5a has an internally threaded bore 10 at its central location, which traverses the depth of the member. The bore 10 receives a rotatable operating member 11 which is externally threaded to mate with the bore 10, the operating member 11 having a hexagonal-headed bolt 12 at the top and an integrally extended part 13 at the bottom. The extended part 13 of the operating member 11 is fitted inside a recess 15 in a bearing plate 14 mounted to the cover 4. The purpose of the extended part 13 is to prevent the operating member 11 from being slipped away from the cover 4. The cover 4 has protruded parts 16, 16a mounted on the opposite sides perpendicular to the longitudinal sides, the protruded part having a recess formed on one side and which is to be engaged by a manipulator latch which will be later described.

In the above described embodiment, the cover removing operation takes place in the following manner, assuming that the cover is now mounted to the container.

(1) The operating member 11 is rotated by means of any power-driven device in the direction of an arrow a (counterclockwise) in FIG. 1. This causes the tightening members 5, 5a to advance in the direction of an arrow b in FIG. 2. Thus, the pawls 9 of the tightening member 5, 5a release the corresponding flanged edges 2 which are now engaged by the nails. (2) Next, the tightening member 5 is rotated by means of the power-driven device in the direction of an arrow c in FIG. 1. This rotation is continued until the tightening member is placed in its position substantially perpendicular to the longitudinal sides of the cover. In this case, the tightening member 5, rather than the other 5a, has been operated, buth the other 5a operates in the same way since those members 5 and 5a are interconnected by means of the pivotted links 7. Therefore, either of them may directly be operated. When the rotation is completed, the pawls 9 are completely detached from the corresponding flanged edges 2, freeing the container from its engaged condition and thus allowing the cover to be removed from the container.

(3) The cover 4 is actually removed from the container 1 by causing the manipulator latches to engage the corresponding protruded parts 16, 16a on the cover. This concludes the cover removing operation.

The cover mounting operation may be achieved by reversing the steps of the cover removing operation as described above. First, the cover 4 is placed on the container 1 so that its opening 3 is closed by the cover. Then, either of the tightening members 5 and 5a is rotated in the direction opposite to that as indicated by the arrow c in FIG. 1. Rotating the tightening member 5, for example, also causes the other member 5a to rotate in the same manner, causing the pawls 9 for those members 5 and 5a to engage the corresponding flanged edges 2 of the container 1. In this state, the operating members 11 for the tightening members 5 and 5a are rotated in the direction (clockwise) opposite to that as indicated by the arrow a in FIG. 1. This clockwise rotation causes the tightening members 5, 5a to retract oppositely to the direction as indicated by the arrow b in FIG. 2. Thus, the cover 4 holds the container 1 firmly by means of the pawls 9 engaging the flanged edges 2, keeping the interior of the container hermetically sealed.

Figure 3:
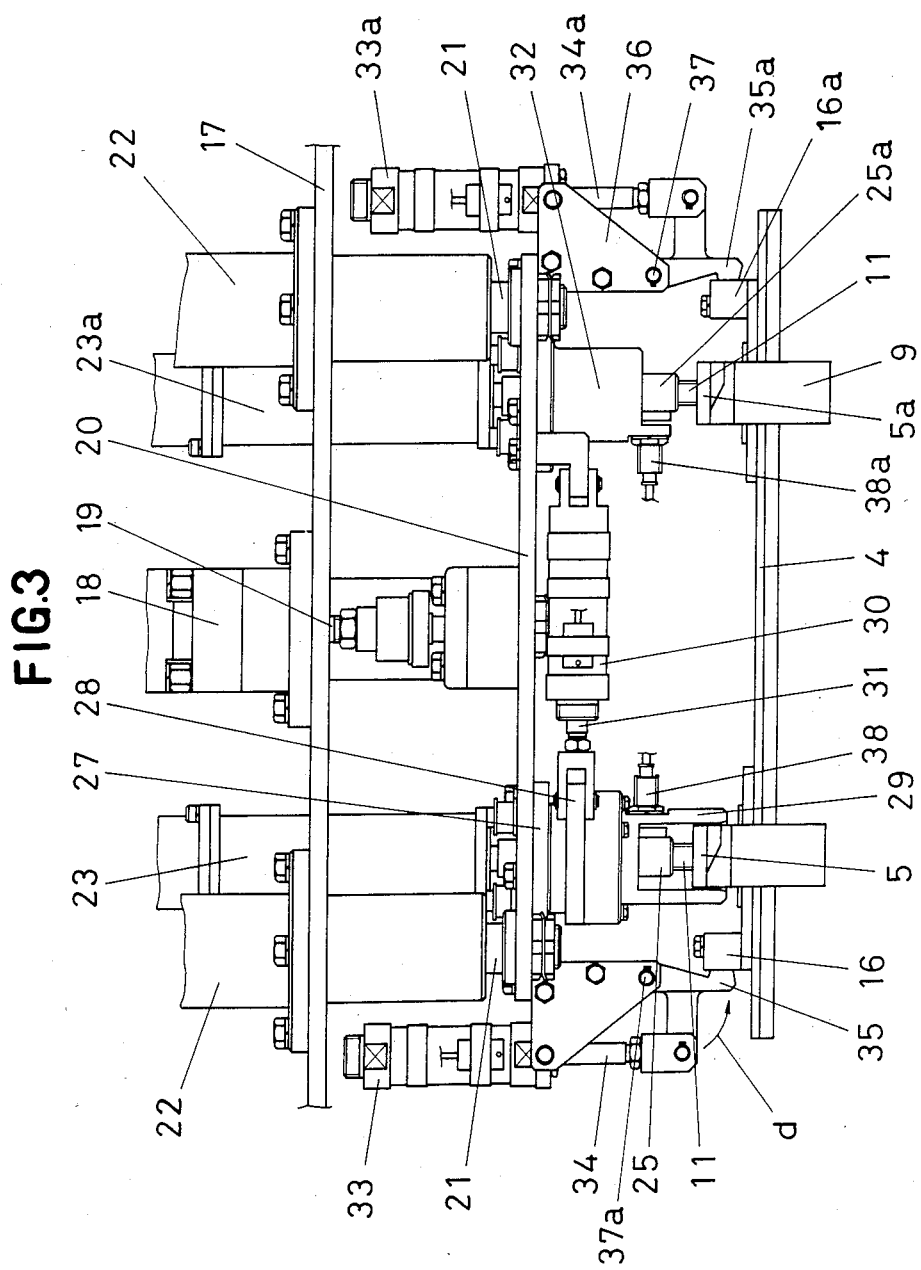
FIG. 3 is a front elevation of the apparatus that provides the cover mounting or removing operation, with some parts omitted.
Figure 4:
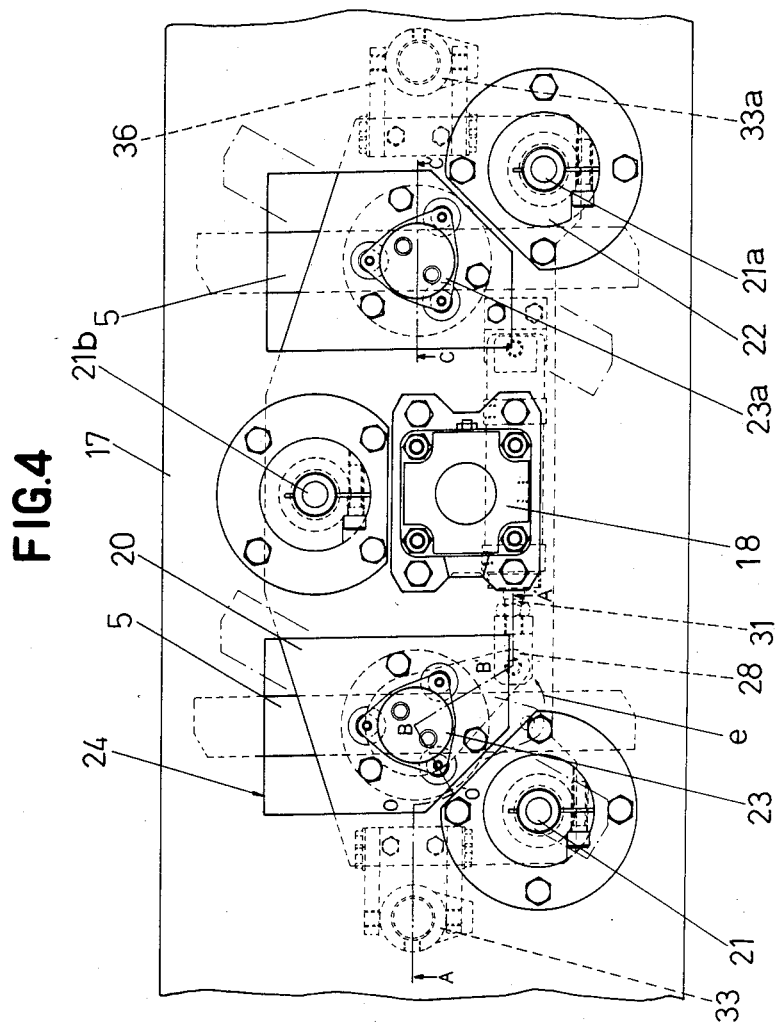
FIG. 4 is a plan view of FIG. 3.
Figure 6:
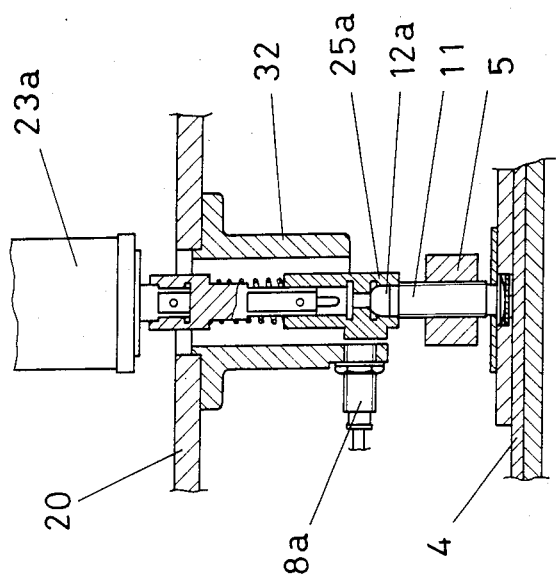
FIG. 6 is an enlarged sectional view taken along the line C—C' in FIG. 4.
Figure 5:
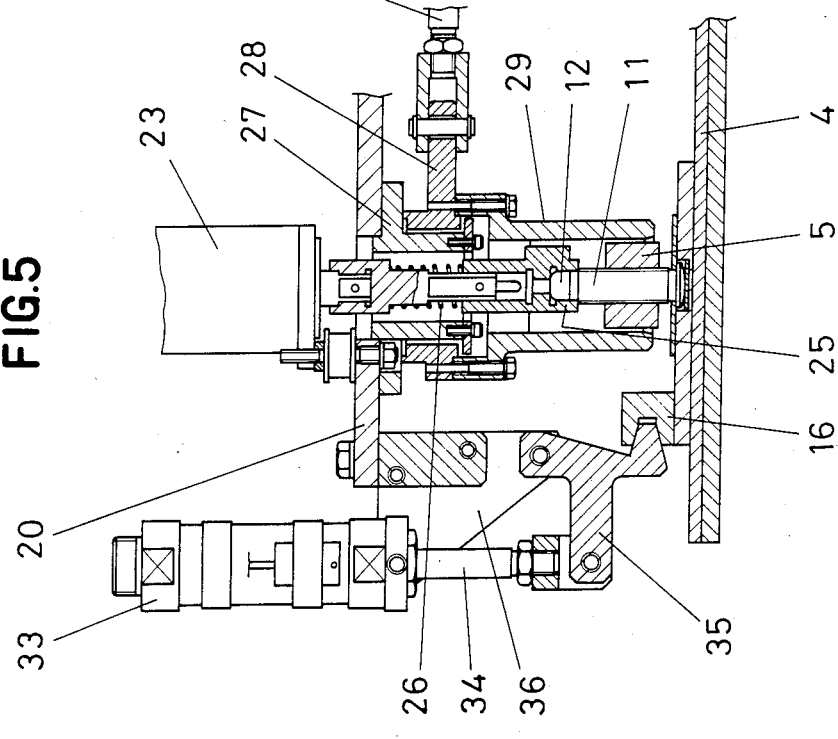
FIG. 5 is an enlarged sectional view taken along the line starting with A through O, O', B, B', and ending with A' in FIG. 4.

The construction of the manipulator for handling the cover is illustrated in FIGS. 3 through 6. This manipulator is provided with movable support means for moving the cover close to or away from the container located below it, and is now described in detail. As its general configuration is shown in FIG. 3, a mounting plate 17 carries a fluid-operated cylinder 18 thereon. The fluid-operated cylinder 18 contains a piston rod 19 which extends or retracts through the mounting plate 17 under the action of the introduced fluid and whose forward end is connected to a traveling plate 20 which travels up and down under control of the cylinder 18. The traveling plate 20 carries three guide rods 21, 21a, 21b, rigidly secured at one end thereof to the plate 20. Each of the guide rods is accommodated within a corresponding housing 22 which is mounted through the mounting plate 17. As such, those guide rods are capable of sliding movement through the respective housings under the action of the extending or retracting piston rod 19 of the cylinder 18. The traveling plate 20 also carries a reversible rotation means, such as a socket gun 23, 23a (the one supplied from the Giken company in Japan, for example), which is located opposite the corresponding operating member 11 on the cover 4. Each of these socket guns 23, 23a is capable of moving up and down through an opening 24 provided in the mounting plate 17. Each socket gun has a socket 25, or 25a at its forward end, which is driven for rotation by introducing air into the socket gun. The rotation of the sockets 25, 25a is detected by a torque detector (not shown), which responds to the preset torque to the nut. When the preset torque is reached and this is detected by the torque detector, the rotation of the socket is stopped. The direction of rotation for the socket is controlled by switching the air feed paths through which air is introduced into the socket gun, so that its rotation can alternatively be reversed. Beneath the location where the socket gun 23 is mounted on the traveling plate 20, a boss 27 is rigidly secured to the plate 20, and a flanged pipe 28 is fitted around the boss 27, as shown in FIG. 5. The flanged pipe 28 includes a tightening member rotation means, such as a forked end 29 at its lower portion, between which the tightening member 5 is to be held. The flanged portion of the pipe 28 is rotated by reversible pipe member rotation means which comprises a piston rod 31 from a fluid-operated cylinder 30, which is rotatably fixed to the flanged portion. For the other socket gun 23a, a boss 32 alone is mounted beneath the location where it is mounted on the plate 20, as shown in FIG. 6. Latching means includes fluid-operated cylinders 33 and 33a are provided on the opposite sides of the traveling plate 20, as shown in FIG. 3, and their respective piston rods 34 and 34a have a latch 35, or 35a at the forward end thereof. These latches 35 and 35a are also pivotally supported by pins 37, and 37a respectively, which are mounted to a triangular-shaped plate 36 which is in turn rigidly mounted to the traveling plate 20. The latches 35 and 35a can swing on the pins 37 and 37a under the action of the piston rods 34, 34a, and can engage the corresponding lateral recesses formed in the protruded parts 16, 16a on the cover 4 when they are swung as indicated by arrow d in FIG. 3.

As shown in FIG. 3, a proximity or micro switch 38 is provided on the flanged pipe 28, and a proximity or micro switch 38a is also mounted on the boss 32. Both proximity switches 38 and 38a are actuated in response to the preset number of rotations of the sockets 25. The specific function of the proximity or micro switches is to determine the actual number of turns of the sockets 25, 25a thereby ensuring that the sockets have completely mated with the corresponding hexagonal-headed bolts 12 of the tightening members 11. Each of the above-mentioned fluid-operated cylinders is equipped with a per-se known proximity switch, which is actuated in response to the retracted or extended position of the piston rod.

The following is a description of the operation of the manipulator whose construction has been illustrated above.

For the cover removing operation:

(1) For convenience of the description, it is assumed that initially the traveling plate 20 is placed in its raised position and the latches 35 and 35a are swung open. Then, introducing a fluid under pressure into the piston side of the fluid-operated cylinder 18 causes its piston rod 19 to be extended, causing the traveling plate 20 to move down toward its lower position. When the traveling plate 20 is lowered, the sockets 25 and 25a are made to mate with the corresponding hexagonal-headed bolts 12 and 12a while the forked end 29 of the flanged pipe 28 is made to engage the tightening member 5.

(2) Next, an appropriate amount of air is drawn into the socket guns 23 and 23a. This causes the corresponding sockets to be turned in the direction as indicated by the arrow a. When the preset number of turns is reached, which is detected by the torque detector, the rotation of the sockets is stopped. Then, the proximity switches 38 and 38a check to ensure that the sockets have turned by the required number of rotations.

(3) The operating members 11 are than rotated by the sockets, causing the tightening members 5 and 5a to advance as indicated by the arrow b in FIG. 2. This releases the container from the pawls that engage its flanged edges.

(4) Following the above step, a fluid under pressure is introduced into the piston rod side of the fluid-operated cylinder 30, causing its piston rod 31 to be retracted. The retracting piston rod 31 acts on the flanged pipe 28 so that it can be rotated in the direction of an arrow e in FIG. 4. Then, the tightening member 5 which is directly controlled by the flanged pipe 28 is turned about its central bore 10, and the associated tightening member 5a is also turned. When they are turned to the position where they are placed perpendicularly to the longitudinal sides of the container, they are stopped. As described, those two tightening members 5 and 5a are interconnected by means of the pivotted links, so that operating one tightening member 5 in this case also causes the operation of the other 5a in the same way. With the tightening members in the position as indicated by dot-dash lines in FIG. 1, their pawls 9 are completely detached from the corresponding flanged edges 2 of the container, freeing the container from its engaged condition.

(5) The preceding step is followed by introducing a pressurized fluid into the piston sides of the fluid-operated cylinders 33 and 33a. Then, their piston rods 34 and 34a are extended, pivoting the latches 35 and 35a about their pins 37 so that they can engage the corresponding recessed parts 16 and 16a.

(6) Finally, a pressurized fluid is introduced into the piston rod side of the fluid-operated cylinder 18, causing its piston rod 19 to be withdrawn. With this withdrawal, the traveling plate 20, which carries the cover 4 held by the latches 35 and 35a, is moving up. Thus, the cover is completely removed from the container, and the cover removing operation is now completed.

For the cover mounting operation:

(1) The cover mounting sequence may be performed by reversing the cover removing sequence. These steps start with lowering the traveling plate 20 carrying the cover 4 down to the position where the container 1 is located. When the cover 4 is placed on the top opening of the container, the latches 35 and 35a are swung back, releasing the cover from the latches.

(2) Then, the tightening members 5 and 5a are turned oppositely to the direction of the arrow c in FIG. 1, until they are placed in the position as indicated by the solid line. With the members 5 and 5a in the above position, their pawls 9 are automatically made to engage the flanged edges 2 of the container 1.

(3) Next, air is fed into the socket guns 23 and 23a through the air path that is different from that for the cover removing operation. This causes the sockets 25 and 25a to rotate oppositely to the direction of the arrow a in FIG. 1. Thus, the operating members 5 and 5a are retracted in the direction opposite to that shown by the arrow b in FIG. 2. This brings the cover packing 4a into intimate contact with the peripheral flanged edge 2 of the container 1, thereby keeping the container hermetically closed by the cover. This is detected by the torque detectors on the socket guns 23 and 23a, which stop the feed of air into the socket gun, thereby stopping the rotation of the sockets. In response to this detection, the micro switches 38 and 38a are also actuated, checking to make sure that the preset number of turns for the sockets, and thus the operating members has been reached. The torque detectors coupled with the micro switches can ensure that the operating members 11 have mated with the corresponding bores 10 in the tightening members 5 and 5a.

The several preferred embodiments of the present invention, including the manipulator for handling the cover, have been fully been described. As readily understood from the preceding description, the present invention offers the advantages of merits over the prior art apparatus of the sort disclosed hereinabove. Among others, one advantage is the provision of the pair of tightening members on the cover that are pivotally linked with each other, so that the stationary or fixed pawls at both ends of the tightening members can be made to engage the corresponding lateral flanged sides of the top opening of the container by turning the tightening members through a specific angle from the position perpendicular to the above lateral flanged sides to the position that is displaced from that position. This simple construction permits the automatic cover mounting or removing operation to occur simply by turning the pair of tightening members, which allows for the engagement or disengagement of the fixed pawls with respect to the lateral flanged edges.

Although the present invention has been described by way of the examples thereof, it should be understood that various changes and modifications may be made without departing from the spirit and scope of the invention.

What is claimed is:

1. An apparatus for mounting and demounting a rectangular-shaped cover which closes a rectangular-shaped opening in an equilateral polygonal or cylindrical-shaped body of a container, comprising:
- a plurality of bearing plates disposed on said cover, each of said bearing plates having a recess therein;
- a plurality of operating members, each of said operating members having one end thereof rotatably fitted in said recess of a corresponding one of said bearing plates, the other end of each of said operating members being externally threaded;
- a plurality of tightening members, each of said tightening members having a threaded hole therethrough at a point intermediate opposite ends thereof, said threaded hole engaging a respective one of said externally threaded operating members for moving said respective one of said tightening members towards and away from said cover in response to rotation of a corresponding one of said operating members;
- a pair of hook-shaped pawls fixedly attached to each of said tightening members, each of said pair of pawls being adapted to engage a corresponding opposite lateral flanged edge of said container in response to rotation of said tightening members about a corresponding one of said operating members; and
- means for automatically mounting said cover on said container and for automatically demounting said cover on said container, said means including latching means for engaging and disengaging with said cover, a pluraity of reversible rotation means for effecting clockwise and counterclockwise rotation of said operating members, tightening member rotation means for rotating at least one of said tightening members about a respective one of said operating members to bring each of said pawls into and out of engagement with a corresponding flanged edge of said container, moveable support means for moving said latching means, said tightening member rotation means and said reversible rotation means towards and away from said container.

2. The apparatus of claim 1, wherein a pair of tightening members are provided and a pair of links are rotatably connected at one end thereof to one of said pair of tightening members and at the other end thereof to the other one of said pair of tightening members.

3. The apparatus of claim 1, wherein said latching means comprises a pair of pivotable latches mounted on said support means and a pair of fluid actuated pistons each of which is connected between said support means and a respective one of said latches for pivoting said latches into engagement with said cover when said pistons are actuated.

4. The apparatus of claim 1, wherein said reversible rotation means comprises air driven socket guns mounted on said support means at positions corresponding to the locations of said operating members whereby said socket guns can be brought into engagement with said operating members for rotation thereof and thereby selectively move said tightening members towards or away from said cover.

5. The apparatus of claim 1, wherein said tightening member rotation means comprises a rotatable pipe member mounted on said support means with a respective one of said plurality of reversible rotation means extending through said rotatable pipe member, said rotatable pipe member having a free end adapted to engage a respective one of said tightening members for rotation therewith about a respective one of said operating members, and said tightening member rotation means further comprising reversible pipe member rotation means mounted on said support means for rotating said rotatable pipe member to thereby engage and disengage said pawls of said tightening members with respective flanged edges of said container through rotation of said one of said tightening members.

6. The apparatus of claim 5, wherein said reversible pipe member rotation means comprises a fluid actuated piston pivotally connected to both said support means and a flange on said pipe member whereby said pipe member is rotated in response to actuation of said piston.

* * * * *